US009573613B2

(12) United States Patent
Wittorf et al.

(10) Patent No.: US 9,573,613 B2
(45) Date of Patent: Feb. 21, 2017

(54) OPERATING DEVICE, STEERING WHEEL, MOTOR VEHICLE AND METHOD THERETO

(71) Applicant: GM GLOBAL TECHNOLOGY OPERATIONS LLC, Detroit, MI (US)

(72) Inventors: Marten Wittorf, Ingelheim (DE); Peter Kahler, Nierstein (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 73 days.

(21) Appl. No.: 14/095,186

(22) Filed: Dec. 3, 2013

(65) Prior Publication Data
US 2014/0157936 A1  Jun. 12, 2014

(30) Foreign Application Priority Data

Dec. 4, 2012  (DE) .................. 10 2012 023 671

(51) Int. Cl.
*H01H 25/04* (2006.01)
*B62D 1/04* (2006.01)
*G05G 1/02* (2006.01)
*G05G 1/08* (2006.01)
*B60R 16/00* (2006.01)
*H01H 25/06* (2006.01)

(52) U.S. Cl.
CPC ............ *B62D 1/046* (2013.01); *B60R 16/005* (2013.01); *G05G 1/02* (2013.01); *G05G 1/08* (2013.01); *H01H 25/04* (2013.01); *H01H 25/06* (2013.01); *Y10T 74/20256* (2015.01)

(58) Field of Classification Search
CPC .......................... B60K 2350/928; B60K 37/06

USPC .................................. 200/61.4, 339
See application file for complete search history.

(56) References Cited

U.S. PATENT DOCUMENTS 6,571,154 B2   5/2003  Worrell et al.
7,488,906 B2   2/2009  Taguchi et al.
(Continued)

FOREIGN PATENT DOCUMENTS

DE    19715360 A1    10/1998
DE    19920525 A1    12/2000
(Continued)

OTHER PUBLICATIONS

Great Britain Patent Office, Great Britain Search Report for Great Britain Application No. 1319871.8, dated May 13, 2014.

*Primary Examiner* — Renee Luebke
*Assistant Examiner* — Ahmed Saeed
(74) *Attorney, Agent, or Firm* — Lorenz & Kopf LLP

(57) ABSTRACT

A motor vehicle is provided with a steering wheel, in the spoke of which an operating device, in particular a modular multi-function operation device, for arrangement in a spoke of a motor vehicle steering wheel, that includes, but is not limited to an operating element that is rotatable about an axis of rotation, in particular a turn-push operating element for operation with turning and/or pushing, which is coupled to at least one sensor for generating a control signal. The axis of rotation is obliquely mounted with an angular contact bearing, so that the operating device is oriented projecting in radial direction and in axial direction and the axis of rotation is variable with respect to the inclined mounting with the angular contact bearing, so that a rocking function is realized. In addition, a method is provided for operating instruments of a motor vehicle.

10 Claims, 2 Drawing Sheets

(56) References Cited

U.S. PATENT DOCUMENTS

| | | | |
|---|---|---|---|
| 8,809,716 B2 | 8/2014 | Gohng et al. | |
| 2005/0073195 A1* | 4/2005 | Popilek | 307/10.1 |
| 2013/0229783 A1* | 9/2013 | Fendeleur et al. | 362/23.04 |

FOREIGN PATENT DOCUMENTS

| | | |
|---|---|---|
| DE | 19941960 A1 | 3/2001 |
| DE | 10338098 A1 | 3/2005 |
| DE | 10346112 A1 | 4/2005 |
| DE | 102005012715 A1 | 5/2006 |
| DE | 102008042459 A1 | 4/2010 |
| GB | 2484789 A | 4/2012 |
| JP | H10334771 A | 12/1998 |
| JP | 2007186148 A | 7/2007 |
| JP | 2008098044 A | 4/2008 |

\* cited by examiner

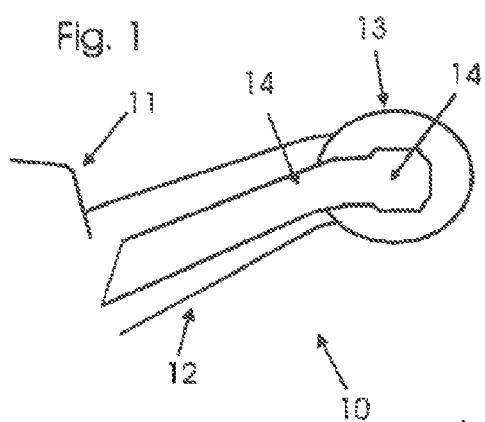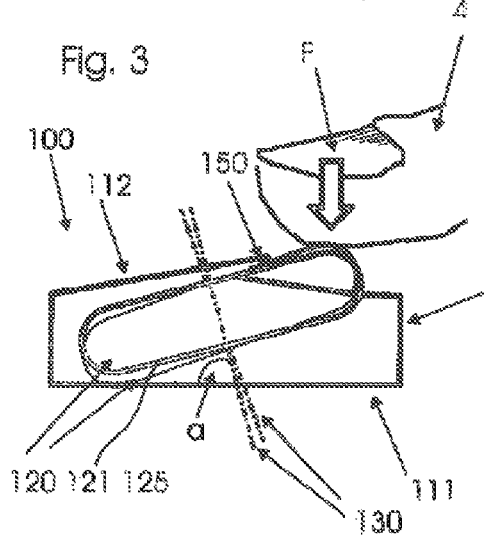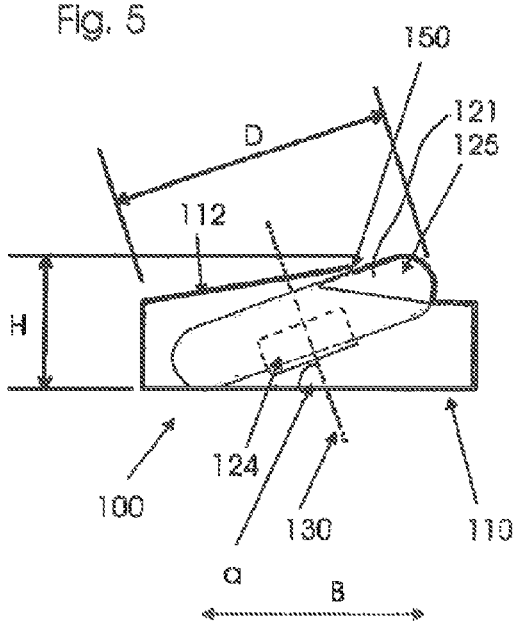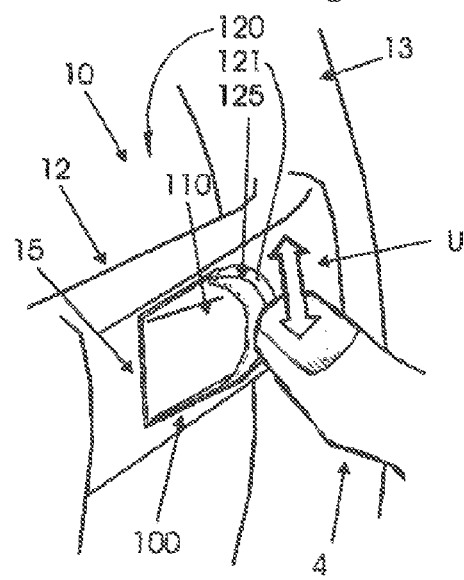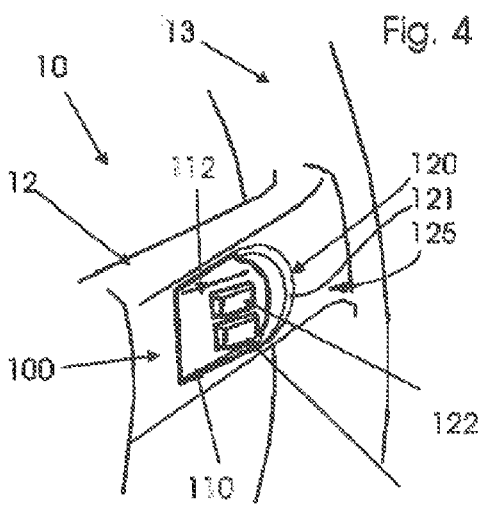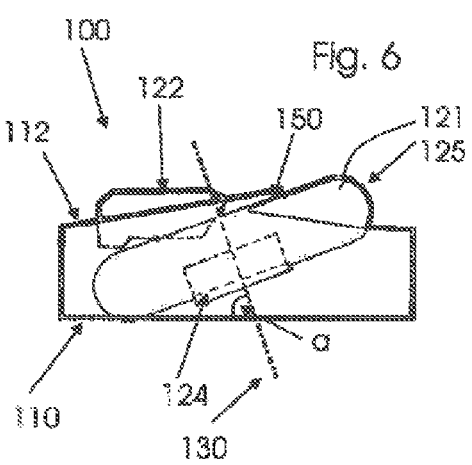

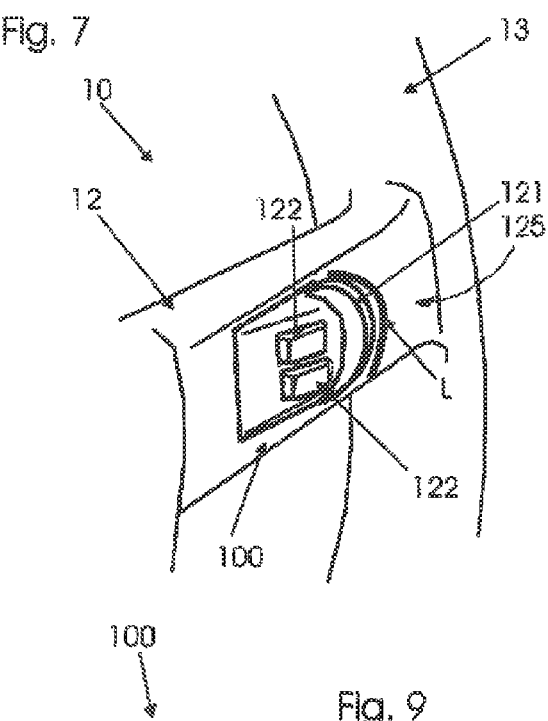
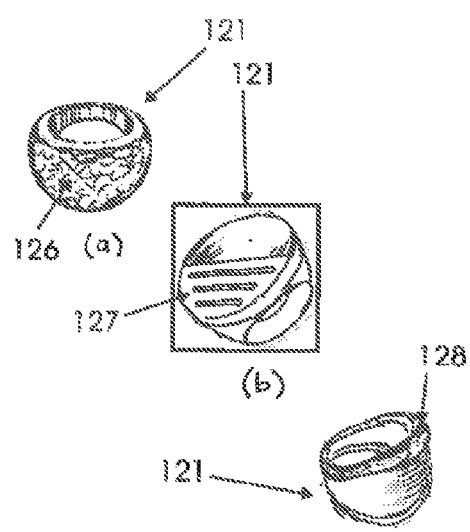
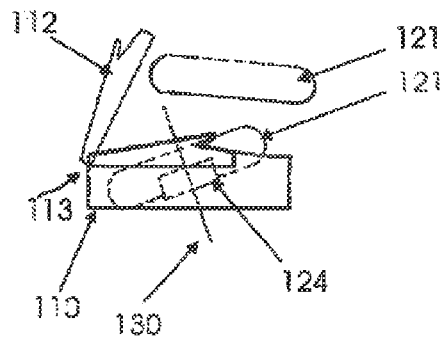
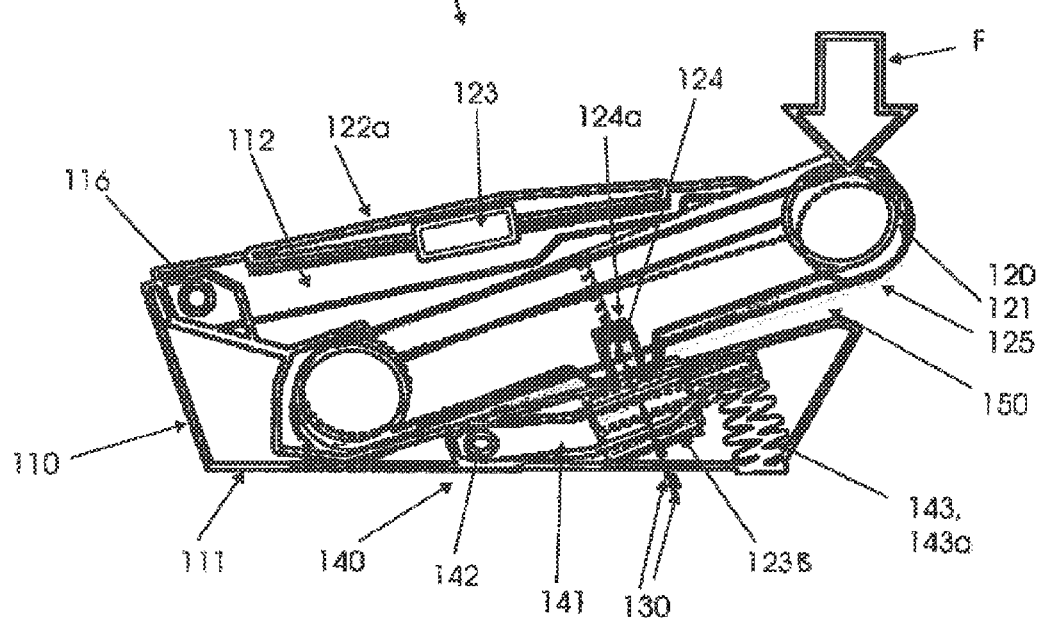

OPERATING DEVICE, STEERING WHEEL, MOTOR VEHICLE AND METHOD THERETO

CROSS-REFERENCE TO RELATED APPLICATION

This application claims priority to German Patent Application No. 10 2012 023 671.9, filed Dec. 4, 2012, which is incorporated herein by reference in its entirety.

TECHNICAL FIELD

The technical field relates to an operating device, in particular a modular multi-function operating device, for arrangement in a spoke of a motor vehicle steering wheel, in particular a sport type steering wheel for a motor vehicle a motor vehicle with at least one steering wheel, and a method for operating instruments of a motor vehicle.

BACKGROUND

Multi-function operating units for activating motor vehicle instruments are generally known. Such operating units are employed for the control of navigation devices, radios, telephone systems and the like. The operating units are employed in different locations in the motor vehicle, preferably so that a user can reach these ergonomically or easily without being excessively distracted from the road traffic.

From DE 103 46 112 a multi-function operating device for a motor vehicle with a steering wheel having at least one spoke is known. The multi-function operating device comprises a display and an input device for selecting menu items displayable on the display and wherein the input device is arranged on the at least one spoke. From DE 103 38 098 B4 a steering wheel having a steering wheel rim and a switching device for the manual actuating of switching functions on controllable motor vehicle devices such as communication and/or information devices is known, by which the switching device switching functions are selectable and confirmable. The switching device is arranged radially within the steering wheel rim near the inner circumferential surface of the steering wheel rim and comprises a rotary knob that is rotatable about an axis of rotation for selecting the switching function, which for confirming the switching function, is moveable against a spring force. The axis of rotation extends approximately radially to the steering wheel rim and the rotary knob is axially moveable to the axis of rotation for confirming the switching function.

It is at least one object to create an improved operating device, an improved steering wheel, a motor vehicle and a method thereto, which make possible the use of a larger operating element with the same or smaller installation space. In addition, other objects, desirable features and characteristics will become apparent from the subsequent summary and detailed description, and the appended claims, taken in conjunction with the accompanying drawings and this background.

SUMMARY

An operating device, in particular a modular multi-function operating device, is provided for arrangement in a spoke of a motor vehicle steering wheel, comprising at least one turn-push operating element that is rotatable about an axis of rotation for operation by means of turning and/or pushing, which is coupled to at least one sensor for generating a control signal it is provided that the axis of rotation is obliquely mounted with an angular contact bearing, so that the operating device in radial direction and in axial direction is outstandingly oriented and the axis of rotation with respect to the oblique mounting is variable with the angular contact bearing, so that a rocking function is realized.

The turn-push operating element is oriented so that it is moveable about the axis of rotation in circumferential direction. With its part circumference, the operating element projects out of a housing that is provided for operation. Accordingly, the operating element is designed as a rocker. Here, the axis of rotation preferably runs transversely to a rocking axis of the angular contact bearing, in particular perpendicularly thereto, i.e., the rocking axis and the axis of rotation do not intersect one another. By exerting a force on the part circumference, the operating element is variable with respect to its inclination. Thus, the operating element is designed as a rocker-rotary switch. It is rotatable about the axis of rotation and the axis of rotation itself is rockable about the rocking axis. Through the inclined position the larger operating element, in particular with a larger diameter is usable with the same installation space. The surroundings of the operating element are constructed less deep. Thus, the operating element can also be installed in spokes of a sport type steering wheel that is narrower in construction.

In an embodiment it is provided that the angular contact bearing comprises a spring-preloaded lever for the inclined mounting of the turn-push operating element. The lever is mounted in an articulated manner so that it can be pivoted for changing an inclined position of the operating element. A rocking axis or in the following pivot axis of the lever is preferably designed perpendicularly to the axis of rotation of the operating element, preferably both in unactuated as well as in actuated orientation. Here, the axis of rotation and the pivot axis are designed eccentrically to one another, i.e., the axis of rotation does not run through the pivot axis.

In a further embodiment it is provided that on the lever a pressure sensor is arranged, which senses a changing of an inclination. The pressure sensor is designed in any way. A plurality of pressure sensors can be provided. Yet a further embodiment provides that the turn-push operating element is coupled to a rotation sensor. By way of the latter, the rotations of the operating element about the axis of rotation can be sensed and converted into corresponding control signals, for example for selecting menu items. Confirming the selection is possible for example by way of tilting the operating element about the pivot axis.

In addition it is provided in an embodiment that the rotation sensor is coupled to a pressure sensor. In an embodiment, the two sensors are embodied in a unit. In another embodiment, the two sensors are embodied as separate sensors.

Yet a further embodiment provides that the operating device comprises a housing, in which the turn-push operating element is obliquely arranged in such a manner that a part of the turn-push operating element obliquely projects out of the housing. The housing comprises a slot out of which the operating element projects. The operating element is preferably designed as a rotary wheel. Here, the rotary wheel lies flat in the housing inclined by an inclination. The axis of rotation includes an angle, in particular an acute angle preferably in the range of approximately <90°, further preferably approximately <80° and most preferably approximately <75° with a normal of a bottom of the housing. The pivot axis runs approximately parallel to the bottom, in particular transversely to the axis of rotation. Here, the pivot axis is preferably designed perpendicularly to the axis of rotation.

A further embodiment provides that the housing comprises a slid that can be folded open, which together with the housing defines an outlet opening or the slot for the turn-push operating element, so that the latter obliquely projects out of the outlet opening. The lid is hinged to the housing, so that it permits an access to the operating element which is designed as a wheel when folded open. The operating element is fitted onto the rotation sensor in the middle so that the operating element can be easily pulled off and refitted in the direction of the axis of rotation. In this way, easy replaceability is ensured. The rotation sensor comprises a pin or the like for receiving the operating element.

In yet a further embodiment it is provided that at least the turn-push operating element is designed as a direct and/or indirect illumination unit. In an embodiment, the operating element is designed as a self-illuminating operating element. In another embodiment, the operating element is provided as an illuminated operating element. Accordingly, illuminants are provided for the operating element. The illuminants are integrated into or separate from the operating element, for example arranged in the housing. Here, the illuminants are designed in such a manner that these make possible different colorations of the operating element.

Here, the illuminants are activated accordingly. Thus, for example when using the operating element for selecting different options of a menu, the operating element is illuminated red with a non-selectable yet displayed option and illuminated green with a possible selection. When selecting by tilting the operating element, flashing or coloration occurs for example. In an embodiment, the operating element is embodied at least partially transparent. A corresponding activation and power supply is provided.

In addition, it is provided in a further embodiment that the operating device is coupled to a control unit. By way of the operating device and the correspondingly generated signals, further instruments such as navigation systems, hands-free sets, telephone systems, sound systems and the like are controllable via the control device, to which the signals are passed on or by which the signals are received. The coupling to the control unit is preferably embodied bi-directionally. Here, the operating unit, in an embodiment, receives for example light signals from the control unit so that a corresponding illumination of the operating element or of the entire operating device takes place. The operating device for example sends the signals of the sensors generated out of the movement of the operating element to the control unit.

In an embodiment, the operating device comprises further operating elements in addition to the operating element designed as a wheel, for example as switches, in particular operating elements designed as rocker switches or toggle switches. These are likewise accommodated in or on the housing. In an embodiment, the operating elements are coupled to one another. In another embodiment, the operating elements are separate from one another. Preferably, all operating elements are coupled to the control device.

A steering wheel, in particular a sport type steering wheel for a motor vehicle, is provided with at least one spoke projecting from a central coupling member it is provided that the spoke comprises a mounting in which the operating device can be housed or is accommodated in a mounted state. The spoke comprises a recess in which the operating device can be at least partially housed. In particular, the steering wheel is a sport type steering wheel with shallow spokes which require a narrow design of an operating device. A bottom of the recess and a surface of the spoke, which surrounds the recess, are substantially parallel or are parallel.

Accordingly, the operating element inserted in the spoke obliquely protrudes over the surrounding surface of the spoke, preferably only with the lid that can be folded open and the projecting part of the operating element or of the operating elements. Here, the axis of rotation is preferably arranged in the direction perpendicularly to the surface of the spoke. The latter is oriented obliquely to the perpendicular or surface normal of the surface of the spoke and/or of the bottom. In this way, the operating element lies flat and inclined in the housing, so that only a minor depth is required in the spoke for accommodating the operating device.

The direction of rotation of the operating element is preferentially along the surrounding surface of the spoke. Tilting takes place by exerting a force on the operating element in the direction of the surface normal of the spoke. Since only an outer edge or part circumference of the operating element projects out of the outlet opening and the center of the operating wheel is concealed by the housing, a rocker-like operating element is realized. This is realized through the offset of axis of rotation and pivot axis. Accordingly, the pivot mounting of the operating element is arranged eccentrically. Thus, an embodiment provides that in the assembled state the turn-push operating element is arranged obliquely to a surface of the spoke surrounding the operating device, so that the operating element protrudes over the surrounding surface in radial direction and in axial direction.

A motor vehicle, in particular a passenger car, is provided with at least one steering wheel, it is provided that the steering wheel is designed as described above and/or an operating device as described above. The operating device is arranged recessed in the spoke of the steering wheel for the greatest part. The lid of the housing obliquely projects away from the surface of the spoke. The vehicle is, for example, designed as a Sedan, Kombi vehicle, off-road vehicle, minibus, van, minivan, SUV or the like.

In addition, a method is provided for operating instruments of a motor vehicle. It is provided that an operating device described above is provided on or at least partially in a steering wheel described above. Depending on control option at least one of the operating elements of the operating device is differently represented, in particular differently illuminated visually. At least one operating element, in particular the turn-push operating element, is illuminated in an embodiment, in particular illuminated in color and/or is self-illuminating.

BRIEF DESCRIPTION OF THE DRAWINGS

The present invention will hereinafter be described in conjunction with the following drawing figures, wherein like numerals denote like elements, and:

FIG. 1 is a schematic cross-sectioned lateral view illustrating an exemplary steering wheel;

FIG. 2 is a schematic perspective view of a detail of a steering wheel with an operating device in accordance with one embodiment;

FIG. 3 is a schematic sectioned lateral view illustrating a mode of operation of the operating device;

FIG. 4 is a schematic perspective view of another embodiment of the operating device;

FIG. 5 is a schematic sectioned lateral view illustrating the proportions of the operating device in a first embodiment;

FIG. 6 is a schematic sectioned lateral view second embodiment of the operating device according to FIG. 4;

FIG. 7 is a schematic perspective view the detail of an illuminated embodiment of the operating device;

FIGS. 8(a), 8(b), and 8(c) are schematic perspective views of various embodiments of an operating element;

FIG. 9 is a, schematic sectioned lateral view illustrating the insertion of the operating element; and FIG. 10 is a schematic sectioned lateral view illustrating the construction of an operating device in an actuated and unactuated state.

DETAILED DESCRIPTION

The following detailed description is merely exemplary in nature and is not intended to application and uses. Furthermore, there is no intention to be bound by any theory presented in the preceding background or summary or the following detailed description.

FIG. 1 to FIG. 10 show in different views and different levels of detail different embodiments of an operating device 100 of a steering wheel 10 of a motor vehicle (not shown here). FIG. 1 schematically shows the construction of the steering wheel 10 in a cross-sectioned lateral view. From a middle part or coupling part 11 of the steering wheel 10, a spoke 12 radially and axially projects as far as to a surrounding steering rim 13. Here, steering rim 13 and spoke 12 have a common inner structure 14.

The inner structure 14 in this case is designed as a common magnesium core. The spoke 12 is designed as a so-called deep dish style spoke, i.e., as a special type of spoke for a sport-type steering wheel, which are designed flat and in particular small in construction. In order for it to be possible to accommodate an operating device 100 in this spoke 12 the latter has to be of a correspondingly flat design. An embodiment of such an operating device 100 is shown in FIG. 2.

FIG. 2 schematically shows a detail of the steering wheel 10 with operating device 100 in a perspective view. The operating device 100 is designed as a module which can be easily inserted in a mounting or recess 15 in the spoke 12 of the steering wheel 10. The recess 15 in this case is matched to the operating device 100 so that said recess surrounds the operating device 100 preferably free of play. This means a form of the recess 15 is matched to the outer contour of the operating device 100.

The operating device 100 comprises a housing 110, in which an operating element 120, here in the form of a rotary wheel 121, is arranged. The rotary wheel 121 obliquely projects out of the housing 110 on an end located radially outside. In a region projecting from the spoke 12, the housing 110 runs obliquely relative to a surface of the spoke 12 in the adjacent region of the operating device 100. Accordingly, the rotary wheel 121 also lies obliquely, i.e., slightly inclined to the surrounding surface of the spoke 12.

An axis of rotation 130 of the rotary wheel 121 in this case runs substantially in the direction of a surface normal of the surrounding surface of the spoke 12, so that a turning operation of the rotary wheel 121 takes place approximately parallel to the surface or approximately in the direction towards the surrounding steering rim 13. Here, the axis of rotation 130 is arranged obliquely. Operating by means of turning or rotating is effected by means of a finger 4 of a user in the direction of the arrow U. The operating element 120 is designed as a turn-push operating element 125, as is shown more clearly in FIG. 3. This means that the operating element 120 is mounted in such a manner that in addition to a turning movement or turning operation U about the axis of rotation 130, a pushing movement in another direction, transversely or perpendicularly to the axis of rotation 130 can also take place.

FIG. 3 schematically shows the mode of operation of the operating device 100 in a sectioned lateral view. Shown is the push actuation or push operation with the finger 4. With the finger 4, the operator exerts a pushing force F on the part of the rotary wheel 121 that projects out of the housing 110. Through the pressure force F applied eccentrically to the axis of rotation 130, the angle of the axis of rotation 130 with respect to the surface of the spoke 12 or a bottom 111 of the housing 110 changes, as is shown through the two axes of rotation 130.

The obliquely mounted axis of rotation 130 is tilted or performs a tilting movement. The gap or the outlet opening 150 formed through the housing 110, which is formed in particular through the likewise obliquely running lid 112, is correspondingly designed for this tilting movement of the axis of rotation 130 and thus of the rotary wheel 121. The axis of rotation 130 in this case is substantially directed to the bottom 111 or approximately perpendicularly to the surface of the spoke 12, wherein the axis of rotation 130 is formed obliquely to the bottom 111 or to the surface and includes an acute angle of inclination of approximately 75° with the bottom 111. By exerting the pressure force F, the angle of inclination changes by a few degrees, for example by approximately 5° to approximately 10°. In addition to the operating element 120 designed as rotary wheel 121, the operating device 100 can comprise further operating elements 120, as shown in FIG. 4.

FIG. 4 schematically shows the detail according to FIG. 2 in a perspective view with another embodiment of the operating device 100. The shown operating device 100 comprises two further operating elements 120 in addition to the rotary wheel 121. The further operating elements are designed as buttons 122, here as push button switches, rocker switches or the like. Here, the buttons 122 are arranged projecting out of the lid 112. Here, the buttons 122 at least partially penetrate the lid 112. In an interior space formed by the housing 110, the buttons 122 run next to the rotary wheel 121 arranged lying in an inclined position, so that the buttons 122 and the rotary wheel 121 do not collide. In this way, a space requirement is optimized.

The movement of the buttons 122 is sensed via a pressure sensor that is provided. By way of the buttons 122, further functions of connected devices such as navigation systems, radio, telephone, etc. can be controlled via corresponding connections or control devices. The position of the operating elements 120 is shown in more detail in FIG. 5 and FIG. 6.

FIG. 5 schematically shows the proportions of the operating device 100 in a sectioned lateral view in a first embodiment. Here, the rotary wheel 121 lies flat in the housing 110 with the axis of rotation 130 that is inclined relative to the bottom 111. The axis of rotation 130 includes the angle of inclination a with the bottom, which is in the range approximately <90° and approximately >45°. The housing 110 is suitably matched to the obliquely lying orientation of the rotary wheel 121.

To this end, the lid 112 obliquely projects from an end 113 of the housing 110 upwards away from the housing 110. To this end, the lid is spaced from an opposite end axially in a height direction H and a width direction B, so that the outlet opening 150 or the gap is created, out of which the rotary wheel 121 projects. Through the inclined position of the rotary wheel 121, a rotary wheel 121 with a diameter D, which is greater than the dimension in height direction H, is employable, as a result of which a simpler handling of the operating device 100 is realized. The embodiment is particularly advantageous especially through airbags or the like provided in the steering wheel 10 and in particular in the case of flat spokes 12, as are encountered with sport type steering wheels.

The rotary wheel 121 is coupled to a rotation sensor 124. The rotation sensor 124 sits in the housing 110 approximately in the middle or centrally below the rotary wheel 121. The rotation sensor 124 sensed the rotary movement of the rotary wheel 121 and generates corresponding control signals. Here, the rotation sensor 124 comprises a pin or the like, which is formed concentrically to the axis of rotation 130 or defines the latter.

FIG. 6 schematically shows the second embodiment of the operating device according to FIG. 4 in a sectioned lateral view. Here, two buttons 122 are provided on the lid 112 in addition to the embodiment according to FIG. 5. In this case, because of the view only one button 122 is visible. The button 122 penetrates the lid 112 and projects into the interior space of the housing 110 so that the rotary wheel 121 is not negatively affected.

FIG. 7 schematically shows the detail according to FIG. 4 in a perspective view with an illuminated embodiment of the operating device 100. The illumination is symbolically represented by the arch L. The rotary wheel 121 in this case is illuminated and radiates light out of the outlet opening 150 towards the outside or the rotary wheel 121 itself illuminates. The illumination L in this case is dependent on control signals so that for different adjusting possibilities and/or different rotary wheel positions, different illuminations are possible. In order to realize these light effects, different embodiments on rotary wheels 121 are conceivable, such as shown for example in FIG. 8.

In a perspective view, FIG. 8 schematically shows different embodiments of an operating element 120 of the operating device 100 as rotary wheel 121. Here, the rotary wheels 121 are formed of an at least partially transparent material. Here, the rotary wheels 121 can assume different forms, for example semi-spherical, ring-shaped or any other forms that are rotatable about an axis of rotation. Here, the surface has a texture 126, trimmings 127 or even a reinforcement rim 128. In this way, a rotary wheel 121 is individualizable as desired. Because of the exchangeable arrangement of the rotary wheel 121, a subsequent replacement can be easily carried out.

FIG. 9 schematically shows the inserting of the operating element 120 in a sectioned lateral view. In order to realize easy replacing of the rotary wheel 121, for example for individualizing or cleaning the operating device 100, the lid 112 of the housing 110 can be folded open. To this end, the lid 112 is pivotably arranged on the one end 113 of the housing 110, for example with a pivot joint 116 (see FIG. 10). The rotary wheel 121 is fitted onto the rotation sensor 124 and can be easily pulled off the latter. Thus, the rotary wheel 121 can be easily removed and replaced. Following the replacement or cleaning, the lid 112 is folded closed again so that the rotary wheel 121 is concealed by the lid 112 for the greatest part.

FIG. 10 schematically shows the construction of an operating device 100 in an actuated and unactuated state in a sectioned lateral view. By exerting the pressure force F, the rotary wheel 121 or the axis of rotation 130 is tilted. The two positions of the axes of rotation 130 or of the rotary wheel 121 are shown accordingly. The rotary wheel 121 or generally the operating element 120 is suitably mounted for a tilting of the axis of rotation 130 via an angular contact bearing 140. The angular contact bearing 140 comprises a rotary lever which is rotatably or pivotably mounted on the bottom 111 or shorter lever 141. The latter is rotatably connected on a side or an end via a pivot joint 142, which is connected for example to the bottom 112. On the opposite side or end, the lever 141 is resiliently mounted on the bottom 111 with a spring 143. Here, the spring 143 is preferably preloaded in order to push the rotary wheel 121 away from the bottom 111. The spring 143 is designed as a coil compression spring 143a, and is oriented approximately in the same direction as the axis of rotation 130.

A pressure sensor 123 is arranged on the lever 141 approximately in the middle. The pressure sensor 123 senses the change of the rotary wheel 121 brought about by the force F. The pressure sensor 123 is coupled to the rotation sensor 124. Here, the rotation sensor 124 adjoins the pressure sensor 123 approximately in the direction of the axis of rotation 130. The rotation sensor 124 comprises the pin 124a, onto which the rotary wheel 121 is fitted and which at the same time defines the axis of rotation 130. In addition, a further pressure sensor 123B of the buttons 122 is shown.

The pressure sensor 123 is arranged in the region of the lid 112 and assigned to the respective touch button 122. The touch buttons 122 themselves are designed as flat back buttons 122a a for a back function, which make possible for example jumping back to a selection or option. The lid 112 is connected to the rest of the housing 110 via the pivot joint 116.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A modular multi-function operating device for arrangement in a spoke of a motor vehicle steering wheel, comprising:
   a sensor that is configured to generate a control signal;
   a turn-push operating element that is coupled to the sensor, rotatable about an axis of rotation, and configured to operate by turning; and
   an angular contact bearing configured to obliquely mount the axis of rotation so that the turn-push operating element is oriented projecting in a radial direction and in an axial direction and the axis of rotation is variable with respect to an inclined mounting with the angular contact bearing for realization of a rocking function.

2. The modular multi-function operating device according to claim 1, wherein the angular contact bearing comprises a spring preloaded lever for the inclined mounting of the turn-push operating element.

3. The modular multi-function operating device according to claim 2, wherein a pressure sensor is arranged on the spring preloaded lever that senses a changing of an inclination.

4. The modular multi-function operating device according to claim 1, wherein the turn-push operating element is coupled to a rotation sensor.

5. The modular multi-function operating device according to claim 4, wherein the rotation sensor is coupled to a pressure sensor.

6. The modular multi-function operating device according to claim 1, further comprising a housing in which the turn-push operating element is obliquely arranged in such a manner that a part of the turn-push operating element obliquely projects out of the housing.

7. The modular multi-function operating device according to claim 6, wherein the housing comprises a lid that can be folded open that together with the housing defines an outlet opening for the turn-push operating element that obliquely projects out of the outlet opening.

8. The modular multi-function operating device according to claim 1, wherein the turn-push operating element is a direct illumination unit.

9. A sport type steering wheel for a motor vehicle, comprising:
 a spoke projecting away from a central coupling member, wherein the spoke comprises a mounting, in which a modular multi-function operating device is accommodated in an assembled state, the modular multi-function operating device comprising:
 a sensor that is configured to generate a control signal;
 a turn-push operating element that is coupled to the sensor, rotatable about an axis of rotation, and configured to operate by turning; and
 an angular contact bearing configured to obliquely mount the axis of rotation so that the turn-push operating element is oriented projecting in a radial direction and in an axial direction and the axis of rotation is variable with respect to an inclined mounting with the angular contact bearing for realization of a rocking function.

10. The sport type steering wheel according to claim 9, wherein in the assembled state the modular multi-function operating device is arranged obliquely to a surface of the spoke that surrounds the modular multi-function operating device so that the turn-pressure operating device projects over a surrounding surface in the radial direction and in the axial direction.

* * * * *